Sept. 25, 1934.  R. OPPENHEIM  1,974,722
APPARATUS FOR CATALYZING OIL
Filed Nov. 18, 1926
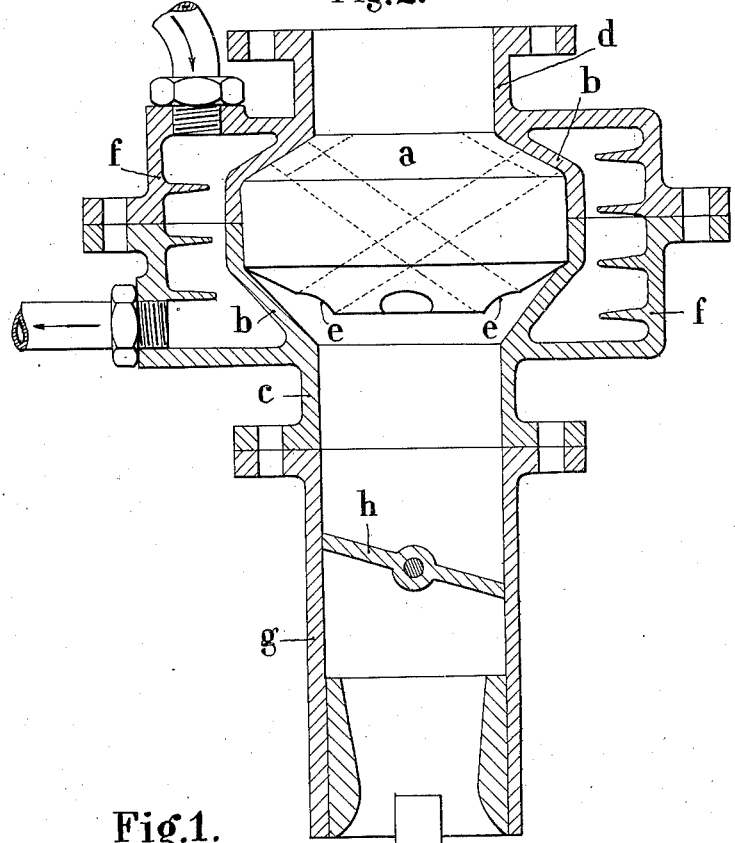
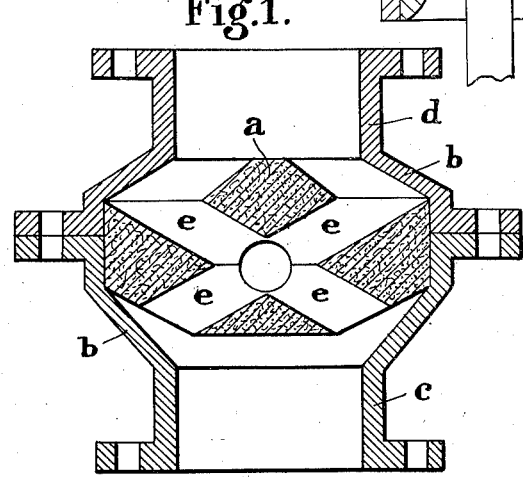
INVENTOR
René Oppenheim
BY
*William H. Young*
Attorney Patented Sept. 25, 1934

1,974,722

UNITED STATES PATENT OFFICE 1,974,722

APPARATUS FOR CATALYZING OIL

René Oppenheim, Gennevilliers, France, assignor to Société Anonyme Le Carbone, Gennevilliers, France Application November 18, 1926, Serial No. 149,230
In France December 5, 1925

10 Claims. (Cl. 123—119)

This invention refers to a method and means for chemically decomposing or cracking, at least in part, heavy oils and hydrocarbons such as petroleum, crude oil, etc., in order to render the same immediately available for use in internal combustion motors and other devices which are ordinarily adapted by their design and form of ignition for using light and volatile oils readily vaporized at ordinary temperatures.

Heavy oils and in particular petroleum, are not capable as is well known, of emitting vapors at ordinary temperature and under atmospheric pressure. For this reason, these heavy liquid fuels have not been capable of being used practically in explosion motors and in internal combustion motors such as, for example, automobile engines.

The means hitherto known for utilizing the heavy fuels in explosion motors consist in strongly heating the pipe which admits the mixture of air and fuel to the motor, but this method has various disadvantages, particularly that of diminishing the power of the motor, and of producing premature ignition and shattering or detonative explosions which cause the motor to "knock".

The present invention has for its object a process and a system of apparatus which permits of the use of heavy oils in explosion motors and internal combustion motors in general without necessitating the heating of the mixture of fuel and air at the moment of its admission to the motor.

The invention consists, substantially, in causing the mixture of heavy oil and air to pass, prior to its admission to the motor, through a catalytic product, such as activated wood charcoal, either agglomerated or in a state of subdivision.

This catalytic product has the effect of producing a partial decomposition and a division of the fuel, in such a way that the mixture which enters the motor is composed of light oil vapors, liquid heavy oil mist or droplets and air. The light vapors, by reason of their great inflammability, ignite rapidly under the action of the igniting means ordinarily employed (such as the electric spark, an incandescent bulb or rod, the heat produced by compression or the like) and by their ignition they produce the ignition of the heavy oils, which latter are present in the form of mist or finely divided droplets in suspension.

The proportion of light vapors thus admitted to the motor may be considerably augmented if the temperature of the catalyst be raised. The temperature at which the maximum degree of efficiency is obtained may vary depending upon the heavy oil used and other known factors.

The invention may be carried out in the form of an independent apparatus interposed between the carbureter and the motor or mounted on the carbureter.

By way of example, a description will be given hereafter of the method of carrying out the present invention.

Figure 1 shows in vertical section a mode of carrying out the invention in which the catalytic material, agglomerated in the form of a block, has internal passages.

Figure 2 shows, also in vertical section, the preferred mode of carrying out the invention in which the catalytic apparatus is mounted directly on a carbureter.

In the mode of carrying out the invention shown in Figure 1 the catalytic product $a$, constituted for example by a block of activated wood charcoal, is contained in a body $b$ forming a jacket or casing provided with two tubes $c$ $d$ connected to the carbureter and the intake of the motor.

In order to offer the least possible resistance to the passage of the mixture of fuel and air the catalyst $a$ agglomerated in the form of a block may be provided with passages $e$, opening directly or indirectly in the inlet and outlet faces of this block. These passages will be preferably arranged obliquely, as shown, so that the contact surface of the combustible mixture and of the catalytic block shall be as large as possible, and the path of the mixture will both be lengthened to prolong its contact with the walls of the passages and also ensure such contact by the deflecting action of such oblique arrangement or modification.

In cases where it is desirable, according to the nature of the fuel employed for example, to raise the temperature of the catalytic product $a$ the body $b$ of the apparatus may be provided, as shown in the preferred construction of Figure 2, with a double jacket $f$, provided preferably with gills on its inner surface, and inside which a hot fluid will circulate, such as, for example, the exhaust gases from the motor. This elevation of temperature has the effect of activating the phenomenon of catalysis and of thus augmenting the percentage of the light vapors furnished by the heavy fuel during its decomposition in the course of its passage through the catalytic product $a$. The decomposition starts at a temperature of 200–250° C., the maximum efficiency being obtained at a temperature of approximately 350° C.

The apparatus which has just been described, with reference to Figure 1, can be interposed at any point on the pipe connecting the carbureter to the motor, or it may be mounted as shown in Figure 2, on a carbureter, on the pipe $g$ containing the butterfly valve $h$ which controls the admission to the motor of the mixture of air and fuel.

By the present invention, the carburetted mixture, furnished by the carbureter and drawn by the motor, is compelled, before it enters this latter, to pass through the catalyst constituted for example by activated wood charcoal, as stated above. In the case illustrated herein, the carburetted mixture passes partly through the mass of activated charcoal $a$ and partly through the passages $e$ formed in it. By its contact with the activated charcoal $a$ the heavy fuel undergoes by the phenomenon of catalysis, a partial decomposition and gives rise to light vapors. Under these conditions, the carburetted mixture when it emerges from the apparatus is composed of light oil vapors, liquid heavy oil mist or droplets and air. When this mixture arrives in the motor, the light oil vapors, which are very inflammable, ignite at once whatever be the mode of ignition used, (e. g. the electric spark, an incandescent bulb or rod, the heat produced by compression or the like), and by their ignition, produce the ignition of the liquid heavy oil mist or droplets as explained above.

It is, of course understood that the heavy oils which are decomposed or cracked by the catalytic action herein described are actually modified and altered chemically to the extent that they are thus decomposed, and thereafter consist of mixtures of lighter and volatile oils and heavier oils.

The forms, dimensions and details of execution of the present system of carburetting apparatus may be modified according to the uses for which it is intended.

The present invention is also applicable in the case of the use of light liquid fuels such as petrol or alcohol and even benzol, the passage of these fuels through the catalyst described above having the effect of transforming these fuels into vapors and thus considerably augmenting the efficiency.

Having now fully described my invention, I claim:

1. An apparatus for cracking heavy oils and thereby rendering the same available for use in explosion and internal combustion motors, including the combination, with a container arranged to interconnect the carbureter and the intake of the motor, of a catalyst in the form of a mass of activated carbon which is disposed within said container which activated carbon is maintained at a temperature above 200° C., and pierced by a channel providing a free passage for said heavy oils through said mass, said channel being generally oblique to the axis of said container in order to prolong the contact of said heavy oils with the walls of said channel and further promote chemical decomposition of said heavy oils.

2. An apparatus for cracking heavy oils and thereby rendering the same available for use in explosion and internal combustion motors, including the combination, with a container arranged to interconnect the carbureter and the intake of the motor, of a catalyst in the form of a mass of activated carbon disposed within said container, which activated carbon is maintained at a temperature above 200° C., and pierced by a plurality of channels providing free passages for said heavy oils through said mass, said channels being generally oblique to the axis of said container in order to prolong the contact of said heavy oils with the walls of said channels and further promote chemical modification of said oils.

3. An apparatus for cracking heavy oils and thereby rendering the same available for use in explosion and internal combustion motors, including the combination, with a container arranged to interconnect the carbureter and the intake of the motor, of a catalyst in the form of a mass of activated carbon disposed within said container and pierced by a channel adapting said carbon catalyst to be traversed by said heavy oils, and heating means arranged in heat conductive contact with said carbon catalyst in order to maintain the same at the cracking temperature of said heavy oils, said channel being generally oblique to the axis of said container to prolong the contact of said heavy oils with the walls of said channel and further promote chemical decomposition of said heavy oils.

4. An apparatus for cracking heavy oils and thereby rendering the same available for use in explosion and internal combustion motors, including the combination, with a container arranged to interconnect the carbureter and the intake of the motor, of a catalyst in the form of a mass of activated carbon disposed within said container and pierced by a plurality of channels adapting said carbon catalyst to be freely traversed by said heavy oils, said channels being generally oblique to the axis of said container to prolong the contact of said heavy oils with the walls of said channels and further promote chemical decomposition of said heavy oils, and heating means arranged in heat conductive contact with said carbon catalyst in order to maintain the same at the cracking temperature of said heavy oils.

5. An apparatus for cracking heavy oils and thereby rendering the same available for use in explosion and internal combustion motors, including the combination, with a container arranged to interconnect the carbureter and the intake of the motor, of a catalyst in the form of a mass of activated carbon disposed within said container and pierced by a channel adapting said carbon catalyst to be traversed by said heavy oils, and heating means arranged in heat conductive contact with said carbon catalyst in order to maintain the same at the cracking temperature of said heavy oils, namely, above 200° C., and said channel being generally oblique to the axis of said container to prolong the contact of said heavy oils with the walls of said channel and further promote chemical decomposition of said heavy oils.

6. An apparatus for cracking heavy oils and thereby rendering the same available for use in explosion and internal combustion motors, including the combination, with a container arranged to interconnect the carbureter and the intake of the motor, of a catalyst in the form of a mass of activated carbon disposed within said container and pierced by a plurality of channels adapting said carbon catalyst to be freely traversed by said heavy oils, said channels being generally oblique to the axis of said container to prolong the contact of said heavy oils with the walls of said channels and further promote chemical decomposition of said heavy oils, and heating means arranged in heat conductive contact with said carbon catalyst in order to maintain the same at the cracking temperature of said heavy oils, namely, above 200° C.

7. An apparatus for cracking heavy oils and thereby rendering the same available for use in explosion and internal combustion motors, including the combination, with a container arranged to interconnect the carbureter and the intake of the motor, of a catalyst in the form of a mass of activated carbon which is disposed within said container, which mass of activated carbon is maintained at a temperature above 200° C., and pierced by a channel providing a free and unobstructed passage for said heavy oils through said mass of activated carbon.

8. An apparatus for cracking heavy oils and thereby rendering the same available for use in explosion and internal combustion motors, including the combination, with a container arranged to interconnect the carbureter and the intake of the motor, of a catalyst in the form of a mass of activated carbon disposed within said container, which mass of activated carbon is maintained at a temperature above 200° C., and pierced by a plurality of channels providing free and unobstructed passages for said heavy oils through said mass of activated carbon.

9. An apparatus for cracking heavy oils and thereby rendering the same available for use in explosion and internal combustion motors, including the combination, with a container arranged to interconnect the carbureter and the intake of the motor, of a catalyst in the form of a mass of activated carbon disposed within said container and pierced by a channel adapting said carbon catalyst to be freely traversed by said heavy oils, and heating means arranged in heat conductive contact with said carbon catalyst in order to maintain the same at the cracking temperature of said heavy oils, which channel is lengthened to prolong the contact of said heavy oils with the walls of said channel and further promote chemical decomposition of said heavy oils.

10. An apparatus for cracking heavy oils and thereby rendering the same available for use in explosion and internal combustion motors, including the combination, with a container arranged to interconnect the carbureter and the intake of the motor, of a catalyst in the form of a mass of activated carbon disposed within said container and pierced by a plurality of channels adapting said carbon catalyst to be freely traversed by said heavy oils, which channels are lengthened to prolong the contact of said heavy oils with the walls of said channels and further promote chemical decomposition of said heavy oils, and heating means arranged in heat conductive contact with said carbon catalyst in order to maintain the same at the cracking temperature of said heavy oils.

RENÉ OPPENHEIM.